United States Patent
Kiefer et al.

(10) Patent No.: US 10,055,993 B2
(45) Date of Patent: Aug. 21, 2018

(54) SYSTEMS AND METHODS FOR CONTROL OF MOBILE PLATFORM SAFETY SYSTEMS

(71) Applicant: GM GLOBAL TECHNOLOGY OPERATIONS LLC, Detroit, MI (US)

(72) Inventors: Raymond J. Kiefer, Huntington Woods, MI (US); Michael G. Carpenter, Romeo, MI (US); Michael A. Wuergler, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 132 days.

(21) Appl. No.: 15/238,985

(22) Filed: Aug. 17, 2016

(65) Prior Publication Data
US 2018/0053419 A1 Feb. 22, 2018

(51) Int. Cl.
G08G 1/16 (2006.01)
H04L 29/08 (2006.01)

(52) U.S. Cl.
CPC ............... *G08G 1/16* (2013.01); *H04L 67/12* (2013.01)

(58) Field of Classification Search
CPC .................................. G08G 1/16; H04L 67/12
See application file for complete search history.

(56) References Cited

U.S. PATENT DOCUMENTS

2012/0289253 A1* 11/2012 Haag .................... G06Q 50/26
455/456.2

* cited by examiner

*Primary Examiner* — Curtis Odom
(74) *Attorney, Agent, or Firm* — Lorenz & Kopf, LLP (57) ABSTRACT

A control system and method of controlling a mobile platform safety system is provided. User input including a modification to a predefined alert response associated with the mobile platform safety system is received, the modification being associated with a geographic location. The pre-defined response, the user modification, and global positioning system (GPS) data are processed to generate therefrom a location specific personalized alert response for the mobile platform safety system.

18 Claims, 4 Drawing Sheets

SYSTEMS AND METHODS FOR CONTROL OF MOBILE PLATFORM SAFETY SYSTEMS

TECHNICAL FIELD

The technical field generally relates to mobile platform safety systems, and more particularly relates to systems and related operating methods for personalized control of a vehicle avoidance system.

BACKGROUND

Vehicle avoidance systems are generally implemented to detect occurrences of specific vehicle operation and/or status conditions, and to trigger alert systems on occurrence of the detected conditions and in some cases trigger automatic control (e.g., braking and/or steering). Vehicle avoidance systems often comprise a series of safety subsystems, each performing a specific task, and collectively employed to warn drivers of, and in some cases automatically exert vehicle control, in response to potential collision threats that may be in the line-of-sight of the driver (e.g., detected by on-board vehicle sensors) or out of the line-of-sight of the driver (e.g., determined from wireless vehicle-to-vehicle communications, vehicle-to-infrastructure communications, and/or vehicle-to-pedestrian communications). Responsive to the detected conditions, vehicle avoidance systems often generate predefined alert response signals that are used to trigger a collision avoidance alert system. Accordingly, the predefined alerts may be automatically controlled. Collision avoidance alert systems can generate any combination of visual, auditory, and haptic alerts, in addition to controlling one or more vehicle subsystems, such as an automatic steering or automatic braking system.

In some scenarios, the predefined alert response triggers the alert system to alert in a manner that has the potential to distract or annoy the driver if the alert is unnecessary or perceived to be unnecessary. These scenarios are often limited to a combination of specific individuals, conditions, and locations. As an example, a user's daily experience of backing out of a garage with known objects in proximity to the vehicle may trigger unnecessary alerts and/or controls that the user wishes to avert. Often, in order to avoid the alerts and/or automatic vehicle control such as braking, the driver may turn the avoidance system off, potentially leaving it off and not benefiting from subsequent collision avoidance alert and automatic vehicle control activations that would enhance driving safety and mitigate vehicle damage.

The present invention provides a system and method for improved control of avoidance systems that addresses these issues, thereby increasing driver safety and reducing vehicle damage. Furthermore, other desirable features and characteristics of the present invention will become apparent from the subsequent detailed description and the appended claims, taken in conjunction with the accompanying drawings and the foregoing technical field and background.

SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter.

A control system for a mobile platform safety system is provided, the control system comprising: a user configuration module that receives a user modification to a predefined alert response associated with the mobile platform safety system; and a personalization module coupled to the user configuration module that receives a safety alert associated with the mobile platform safety system and processes the safety alert, the predefined alert response, and the user modification, to generate therefrom a personalized alert response for the mobile platform safety system.

Also provided is a vehicle, comprising: an avoidance system that generates conditions data associated with a safety subsystem of the avoidance system; and a control system that: receives the conditions data, receives a predefined response to a safety alert indicated by the conditions data, receives a user input modifying the predefined response at a geographic location, generates a personalized alert response for the avoidance system based on the user input and the conditions data, and commands an alert system associated with the vehicle in accordance with the personalized alert response.

Also provided is method of controlling a vehicle avoidance system onboard a vehicle, the method comprising: receiving a user modification to a predefined response to a safety alert associated with the vehicle avoidance system, the user modification comprising a geographic location; processing the safety alert, the predefined response, and the user modification to generate therefrom a personalized alert response; and selectively commanding an alert system associated with the vehicle in accordance with the personalized alert response.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to a processor (shared, dedicated, or group) (FIG. 1, 61) and memory (FIG. 1, 62) that executes one or more software or firmware programs to perform the functionality attributed to the module below; alternatively, a module may be an application specific integrated circuit (ASIC), an electronic circuit, a combinational logic circuit, and/or other suitable components that provide the described functionality. Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

For the sake of brevity, conventional techniques related to transmitting and receiving signals, wireless communication modules, wireless transceivers, network interfaces, and other functional aspects of certain systems and subsystems (and the individual operating components thereof) may not be described in detail herein. In addition, certain terminology may also be used in the following description for the purpose of reference only. Accordingly, the examples presented herein are intended as non-limiting.

Although the following description realizes the mobile platform as a vehicle, the concepts presented here can be deployed in other mobile platforms, such as aircraft, spacecraft, watercraft, motorcycles, scooters, robots, robotic devices, and the like. Moreover, the concepts presented here may also be deployed in non-mobile platform applications, if so desired.

Figure 1:
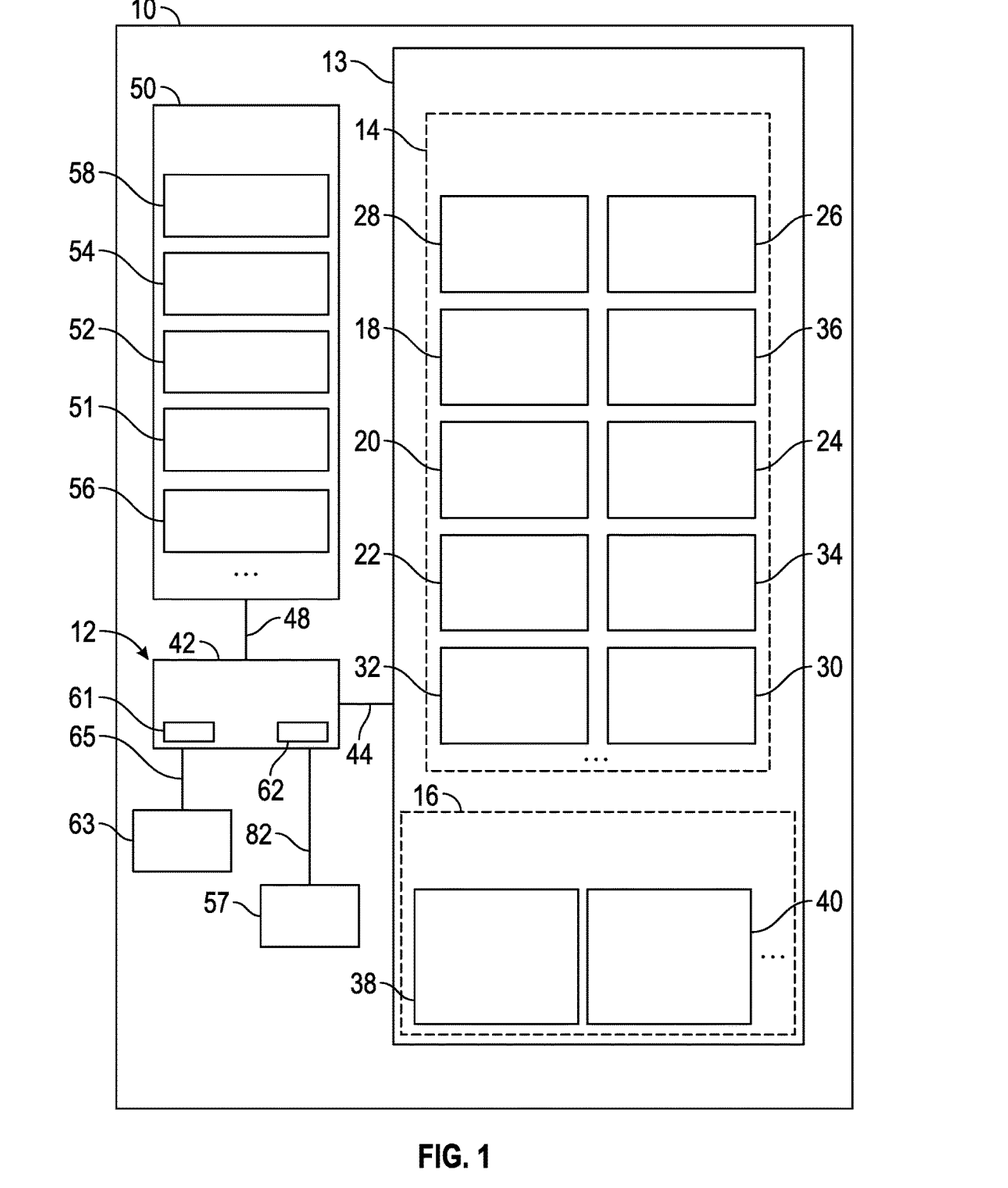
FIG. 1 is a functional block diagram illustrating a vehicle that includes a control system for a vehicle avoidance system, in accordance with exemplary embodiments.

Referring now to FIG. 1, a vehicle 10 is shown having a control system 12 in accordance with various embodiments. The control system 12 may be in operable communication with an avoidance system 13 of the vehicle 10, a global positioning system (GPS) 63, an alert system 50 (which hereafter is intended to also incorporate an automatic vehicle control system), and a user interface 57. Although the figures shown herein depict example arrangements of elements, additional intervening elements, devices, features, or components may be present in actual embodiments. It should also be understood that FIG. 1 is merely illustrative and may not be drawn to scale.

In various embodiments, inputs to the control system 12 may be sensed from the vehicle 10, received from other control modules (not shown) within the vehicle 10 (e.g., through a vehicle communication bus or an intra-vehicle wireless communication), received from modules remote from the vehicle 10 (e.g., through inter-wireless communication or cellular communication), received from one or more sensors (not shown) of the vehicle 10, and/or determined/modeled by other sub-modules (not shown) within the vehicle 10 or control system 12. The control system 12 generally receives conditions data 44 from the avoidance system 13; and, upon occurrence of a set of conditions, the control system 12 generates control signals 48 for an alert system 50 to respond.

As shown, the avoidance system 13 may include a variety of safety subsystems, such as one or more line-of-sight avoidance systems 14 and one or more non-line-of-sight avoidance systems 16. The line-of-sight avoidance systems 14 generally include one or more on-board vehicle sensors (not shown) (e.g., camera, radar, ultrasonic, and/or LIDAR) communicatively coupled to a control module (not shown) that detect a potential for a collision based on the vehicle sensor signals. Exemplary line-of-sight avoidance systems 14 include, but are not limited to, lane departure warning/lane keep assist systems 18, front park assist systems 20, rear park assist systems 22, front and rear automatic braking systems 24, rear cross traffic alert systems 26, adaptive cruise control (ACC) systems 28, side blind zone (or spot) detection systems 30, lane change alert systems 32, driver attention (e.g., distraction- and/or drowsiness-monitoring) systems 34, and front and rear pedestrian detection systems 36.

The non-line-of-sight avoidance systems 16 generally include one or more communication systems or devices (not shown) that can determine or forecast a potential collision. Exemplary non-line-of-sight avoidance systems include, but are not limited to, vehicle communication systems that communicate between the vehicle 10 and other vehicles (not shown) (e.g., vehicle-to-vehicle communication systems 38), vehicle communication systems that communicate between the vehicle 10 and an infrastructure (not shown) (e.g., vehicle-to-infrastructure communication systems 40) and may further include vehicle communication systems that communicate between the vehicle 10 and pedestrians/cyclists to forecast potential collisions due to traffic (not shown). As can be appreciated, in various embodiments, any one of the line-of-sight avoidance systems 14 or the non-line-of-sight avoidance systems 16 can include both vehicle sensors and communication systems to detect activity either inside the line-of-sight of the driver or outside of the line-of-sight of the driver.

A control module 42 receives input 65 from a geographic locating service or system, such as global positioning system (GPS) 63, input 82 from a user interface 57, and conditions data 44 from the various avoidance systems 13 indicating one or more potential collision conditions. As can be appreciated, in various other embodiments, the control module 42 may be integrated with other vehicle control modules (not shown) of the vehicle 10, and/or may be implemented separately for each avoidance system 13. The control module 42 may also be a plug-in device that is installed into an onboard diagnostics connector of the vehicle (OBD-II), a retrofit module that is collocated with an existing vehicle module (i.e., installed at the host module using an adaptation connector), or as a replacement part for an existing vehicle system (i.e., inside rear-view mirror assembly). The control module 42 may be external to the vehicle 10 and include a wireless device that communicatively couples to the vehicle 10 over a short range wireless connection such as Wi-Fi, Bluetooth, or similar.

The control module 42 processes input signals and conditions data and generates therefrom control signals 48. The control signals 48 comprise a location specific alert response used to trigger a collision avoidance alert or automatic vehicle control system (hereinafter "alert system") to inform a driver of the respective condition with sufficient time for the driver to respond and minimize or prevent a potential threat related problem.

An alert response may trigger any combination of the alert system 50 devices. In various embodiments, the alert system 50 can include, one or more alert devices/systems, such as, haptic alert system 51 (e.g., one or more haptic alert devices of a vehicle seat assembly, one or more haptic alert devices of a steering wheel assembly, vehicle "brake pulse" jerk, etc.), one or more auditory alert devices 52 (e.g., warning chimes or beeps, etc.), one or more visual alert devices 54 (e.g., warning lamps, an information center, a screen of an infotainment system, LED panel, head-up display, display reflected off windshield, etc.), and auditory, visual, and haptic devices of an infotainment system 56. As mentioned, alert responses may also trigger controlled vehicle functionality; as such, the vehicle system control devices 58 can include, but are not limited to, a control device that performs vehicle braking, and a control device that adjusts the torque or position of vehicle steering, or other driving maneuvers.

A geographic locating service or system, such as the global positioning system (GPS) 63, may include or communicate with any combination of onboard radar and other onboard instrumentation, such as a radio altimeter, a barometric altimeter, or the like, sufficient to provide geographic location information for the vehicle 10. The user interface 57 may comprise a user input device realized as any combination of: a single switch, keypad, touchpad, keyboard, mouse, touchscreen, joystick, knob, microphone, speech recognition device, gesture interpretation device, or any device suitably adapted to receive input from a user and convert user input into signals for processing by control module 42. User interface 57 may be part of the vehicle 10 existing hardware and software, may be part of a mobile device or personal electronic device, or may be a computer system suitably configured to communicate with the control system 12.

In various embodiments, user input 82 is received, and the control module 42 processes the user input 82 and transforms the predefined response into a personalized alert response for the alert system 50. In this manner, the control module 42 coordinates the generation of the control signals 48 such that the driver is not distracted or annoyed by unnecessary alerts or alert perceived as unnecessary, thereby achieving the technical effect of increasing the likelihood that the driver will keep the avoidance system 13 on, and continue to use it for the safety benefits that it provides. User modifications to predefined responses are described in more detail in connection with FIGS. 2-4.

Figure 2:
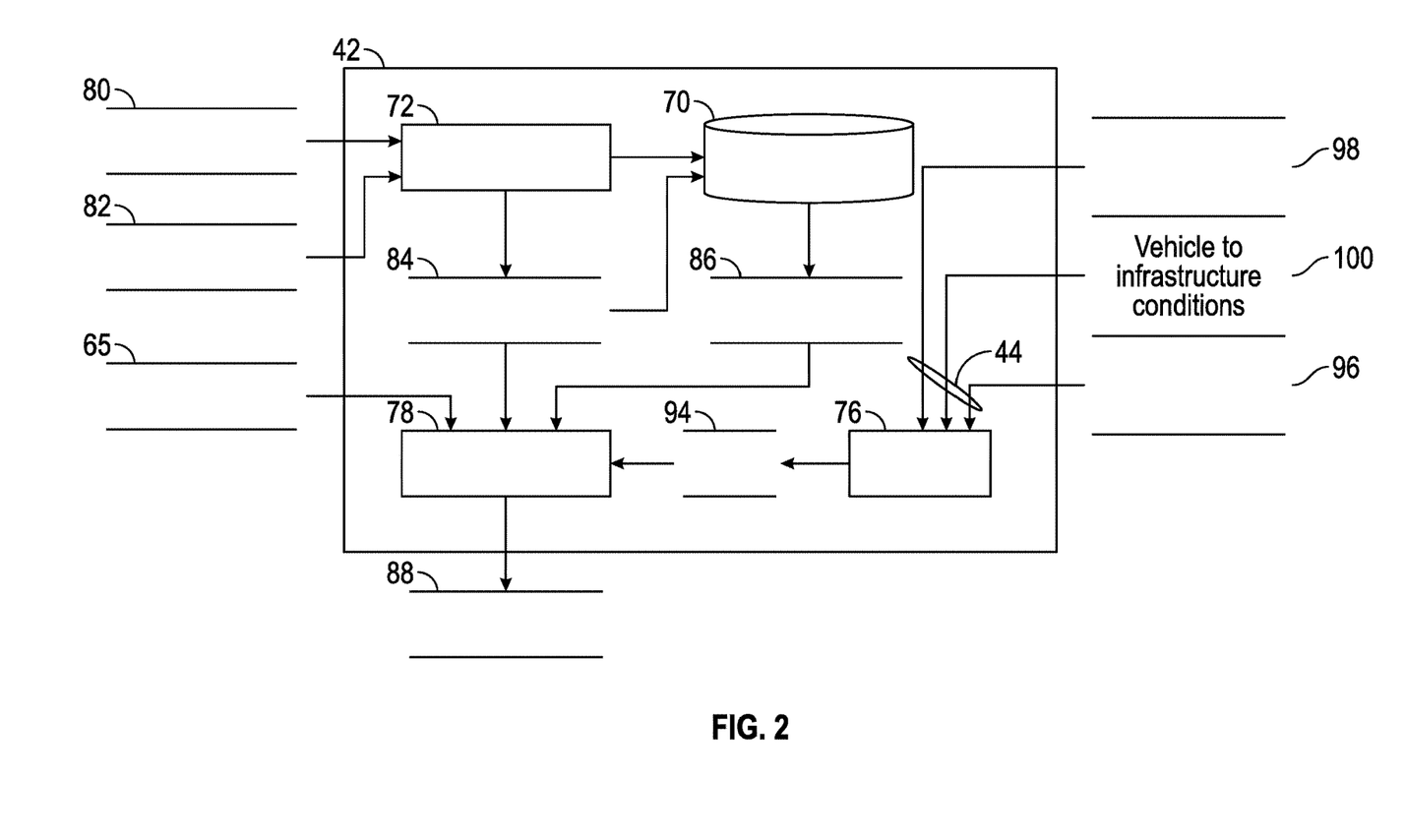
FIG. 2 is a dataflow diagram illustrating the control system of the vehicle avoidance system, in accordance with exemplary embodiments.

Referring now to FIG. 2 and with continued reference to FIG. 1, a dataflow diagram illustrates various embodiments of a control system that may be embedded within the control module 42. Various embodiments of control systems according to the present disclosure may include any number of sub-modules embedded within the control module 42. As can be appreciated, the sub-modules shown in FIG. 2 may be combined and/or further partitioned to similarly coordinate and provide driver alerts and/or request vehicle functions to be performed.

In various embodiments, the control module 42 includes alert settings datastore 70, a user configuration module 72, a monitoring module 76, and a personalization module 78.

The monitoring module 76 monitors the vehicle 10 conditions data 44. The conditions data 44 may indicate a potential collision threat and require alerting the driver. The vehicle conditions data 44 can be received from: the line-of-sight avoidance systems 14 (FIG. 1), as line-of-sight conditions 96; the non-line-of-sight avoidance systems 16 (as vehicle-to-vehicle conditions data 98, and/or as vehicle-to-infrastructure conditions data 100) and/or vehicle-to-pedestrian conditions data (not shown). When the monitoring module 76 detects an occurrence of a set of conditions indicated by conditions data 96-100 to be a potential collision threat, the monitoring module 76 asserts a safety alert 94, defined as an alert that conditions data 44 has identified a potential safety threat. In various embodiments, the monitoring module 76 may determine that the conditions data 96-100 present multiple safety alerts 94. In such a case, the monitoring module 76 generates the multiple safety alerts or, alternatively, arbitrates between the safety alerts based on a priority scheme to generate a single safety alert 94, or alternatively, processes the safety alerts to create a combined safety alert 94.

Figure 3:
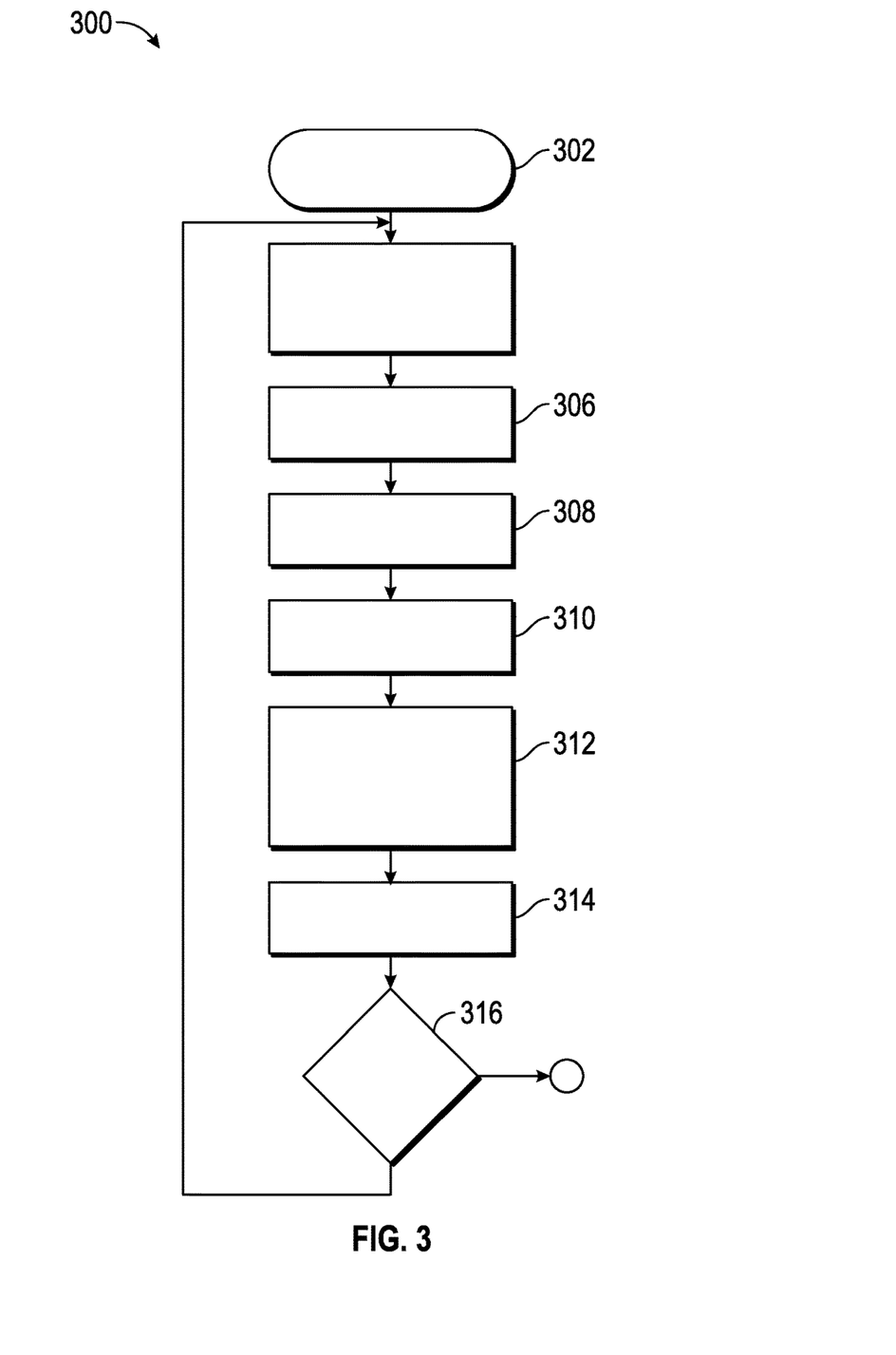
FIGS. 3-4 are flowcharts illustrating methods that may be performed by the control systems in accordance with exemplary embodiments.

For example, as shown in the flowchart of FIG. 3 and with continued reference to FIG. 2, after the vehicle 10 has started operation at 302, the conditions data 96-100 is received and monitored at 304. A safety alert 94 is asserted at 306 when an occurrence of a set of conditions associated with the avoidance system 13 indicates a potential threat. The safety alert 94 may be specifically informative of, or related to, one of the safety subsystems comprising the line-of-sight avoidance systems 14 or the non-line-of-sight avoidance systems 16. Based on the asserted safety alert 94, one or more predefined responses 86 may be indicated at 308; wherein each predefined response 86 may comprise commands to one or more of the devices within alert systems 50.

As described in connection with FIG. 1, the alert system 50 may comprise a variety of alert devices and systems. Accordingly the predefined responses 86 may be commands or patterns of commands to any of the alert devices comprising the alert system 50. The predefined responses 86 for the haptic alert devices 55 can include, but are not limited to, onset or patterns of an occurrence of vibration (e.g., whether or not to perform the vibration for a particular mode), a location of the vibration (e.g., at a particular location on seat or other haptic device), an intensity of the vibration, a duration of the vibration, a rate of the vibration, and/or a frequency of the pulses of the vibration. The predefined responses 86 for the auditory alert devices 52 can include, but are not limited to, an occurrence of the auditory alert (e.g., whether or not to perform the auditory alert), a sound level of the auditory alert, a sound type of the auditory alert (e.g., a particular narrow-band chime or broadband auditory warning signal), a duration of the auditory alert, a rate of the auditory alert, and/or a frequency of sounds of the auditory alert. The predefined responses 86 for the visual alert devices 54 can include, but are not limited to, an occurrence of the visual alert (e.g., whether or not to perform the visual alert), a location of the visual alert (e.g., whether on a heads up display, an LED panel, or other visual alert device), a visual type of the visual alert (e.g., a particular color or symbol), a duration of the visual alert, a rate of the visual alert, and/or a frequency of visuals of the visual alert.

Referring back to FIG. 2, the alert settings datastore 70 stores predefined responses 86. As can be appreciated, the alert settings datastore 70 can include volatile memory that temporarily stores the settings, non-volatile memory that stores the settings across key cycles, or a combination of volatile and non-volatile memory. In various embodiments, the alert settings datastore 70 may reside in a local vehicle module, in a plug-in vehicle accessory device, in user-removable storage (e.g., USB flash drive, Secure Digital SD, etc.), in the storage of a user accommodated device (e.g., consumer smartphone or key fob that is wirelessly paired to the vehicle 10), or in a cloud database. For exemplary purposes, the alert settings datastore 70 is described as being a part of the control module 42.

Continuing with the provided example, the user having a narrow driveway with known objects in proximity may experience, upon every occasion of exiting the driveway, a predefined response 86 to the vehicle avoidance alert systems 13 that can include any or all of the alert system 50 devices. As a non-limiting example, the predefined response 86 may require that an audible chime be emitted, flashing visual icons be displayed, the infotainment system be interrupted, and automatic control over braking. The driver may want to delay (pause), suppress, reduce sensitivity, or override one or more features of the predefined response 86 immediately, and upon each future occurrence of exiting the driveway. In various embodiments, the driver may further want to delay (pause), suppress, reduce sensitivity, or override the one or more features of the predefined response 86 based on a time of day (e.g., a person who backs out of their driveway toward heavy traffic creating excessive cross traffic alerts that are restricted during certain times of day, such as rush hour). The provided control system 12 supports location-specific user modifications including, but are not limited to, complete override of a predefined response 86; a reduction in sensitivity of a predefined response 86; a suspension/suppression of a predefined response 86; and, a delay of the predefined response 86. A delay includes delaying the onset of the predefined response 86 (1) for a user configurable amount of time, and for a user configurable distance traveled. A suspension/suppression may include a temporary override of the predefined response 86 (i) while the vehicle 10 is in a user selected geographic location, (ii) at a specified time of day, and (ii) for a user entered configurable amount of delay time or distance.

Referring again to FIG. 3, and with continued reference to FIG. 2, user modifications to predefined alert responses are received at 310. User modifications are received as user input via user interface 57, and may involve a user manipulation of a single switch, or a user interaction with a configuration menu 80. As mentioned, the user modification comprises a functional modification and a location. The user configuration module 72 manages the display of the configuration menu 80, and manages the user input 82 received from a user interacting with the configuration menu 80. As can be appreciated, the configuration menu 80 can be displayed on a display device within the vehicle 10 (e.g., via an information center), can be displayed on a display device that is remote from the vehicle 10 (e.g., a computing device or personal handheld device), or can be displayed on a device connected to the vehicle 10 (e.g., a technician tool). In various embodiments, the configuration menu 80 may be implemented as a main menu with one or more sub-menus. Each menu or sub-menu may provide selectable options that, when selected, allow a user to configure personalized alert responses for the avoidance system 13.

The user modification may be received at 310 in real time, or it may be a previously received user modification. As used herein, real time means that it is substantially immediately responsive to an alert from the alert system 50. When the user modification is received real time, the GPS 63 or other geographic locating system associated with the vehicle may provide the associated geographic location. Previously received user modifications include those user modifications performed over the user interface 57 with a configuration menu 80 and may further include using a web service, a pin-drop application, a vehicle-to-infrastructure support, a subscription-based communication service, or the like. When the user modification is not received real time, the geographic location may be obtained via the user interacting with the user interface 57. At 310, user configured responses 84 are generated based on the received user modification and the associated geographic location.

The personalization module 78 retrieves predefined responses 86 from the alert settings datastore 70, based on the safety alert 94. At 312, the GPS input 65, the user configured responses 84, the predefined responses 86, and the safety alert 94 are processed to generate a personalized alert response 88. The personalized alert response 88 associates one or more avoidance system 13 conditions with desired alert performance of the alert system 50 (i.e., the auditory alert devices 52, the visual alert devices 54, the haptic alert system 51, an infotainment system 56, and vehicle system control devices 58), and may further associate therewith (i) a geographic location, (ii) a time of day, and (iii) a duration of time.

Responsive to the personalized alert response 88, the timing and/or operation of any or all of a respective predefined response may be delayed, suppressed, overridden, or otherwise modified. In operation, this may be achieved by selectively commanding the alert system 50 in accordance with the personalized alert response 88; the configurable amount of delay time thereby being selectively associated with a device in the alert system 50. If no user modification has been received, at 312 the personalized alert response 88 reflects the predefined response 86.

The user configured response may be one of a plurality of user configured responses. At 316 the method may (i) count a number of user configured responses comprising both the same geographic location and the same user modification, and (ii) determine when the number is equal to a respective predetermined threshold. A threshold number may be preset or user configured. If the number is equal to the threshold number at 316, various steps may follow, as described below.

Figure 4:
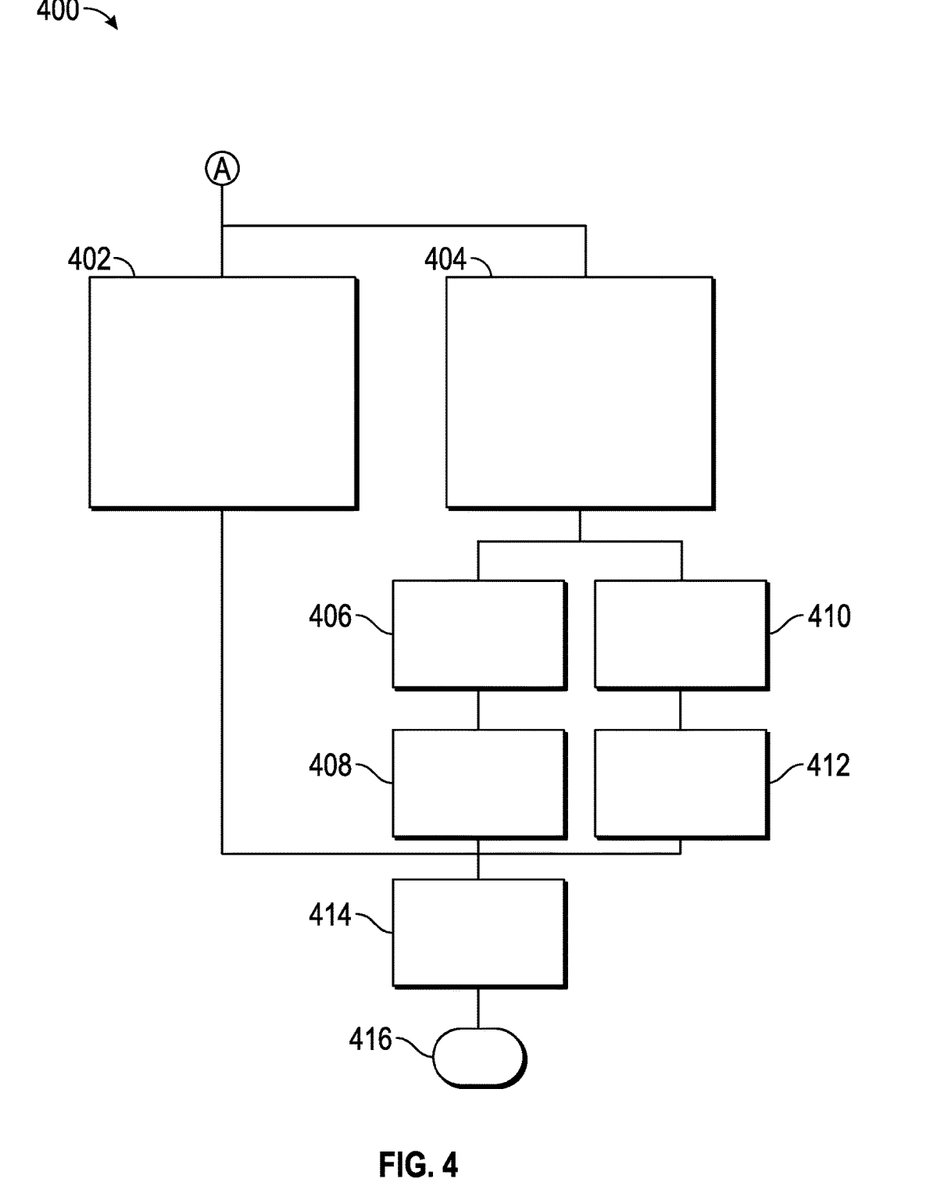

As shown in FIG. 4, and with reference back to FIG. 2, a GPS 63 or geographic locating service or system provides input to the control module 42, which continually monitors the vehicle's location. Responsive to determining that the number is equal to the respective predetermined threshold (at 316), the method of controlling a vehicle avoidance system may, automatically, and without user input, selectively command the alert system 50 in accordance with the personalized alert response 88 on each subsequent occurrence of the respective geographic location (at 402).

Alternately, at 316, responsive to determining that the number is equal to respective predetermined threshold, the method may prompt the user to configure personalized alert responses for the mobile platform safety system at 404. From the perspective of the user, configuring personalization responses may comprise entering one or more user modifications to one or more predefined responses. Following the prompt at 404, configuration menus 80 may be displayed at 406, and may be followed by user assistance via the vehicle 10, a cloud service, a mobile device, and or any suitable user interface 57 at 408 to obtain user modifications. In another alternative, following the prompt at 404, a subscription-based communication service may be called at 410, and the user may follow assistance provided by the subscription-based communication service at 412 to provide user modifications. User modifications may be use to generate user configured responses 84, which may be stored in the alert settings datastore 70 at 414. Thereafter, each time vehicle operation starts at 302, or during continued vehicle operation at 304, previously stored user configured responses 84 may be utilized in the generation of personalized alert responses 88 and the control of alert system 50, as described above.

As can be appreciated in light of the disclosure, the order of operation within the methods shown in the flowcharts is not limited to the sequential execution as illustrated in the figures, but may be performed in one or more varying orders as applicable and in accordance with the present disclosure. As can further be appreciated, one or more steps of the methods may be added or removed without altering the method. In various embodiments, the methods can be scheduled to run based on predetermined events, and/or can run continually during operation of the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A control system for a mobile platform safety system, the control system comprising:
   a user configuration module that receives a user modification to a predefined alert response associated with the mobile platform safety system; and
   a personalization module coupled to the user configuration module that receives a safety alert associated with the mobile platform safety system and processes the safety alert, the predefined alert response, and the user modification, to generate therefrom a personalized alert response for the mobile platform safety system,
   wherein the user modification is configured by a user through a user interface and comprises, at a geographic location, suppressing, by a configurable amount of delay time, the predefined response associated with the safety alert.

2. The control system of claim 1, wherein the user modification further comprises an override of the predefined response to the safety alert at a specified time of day.

3. The control system of claim 1, wherein the predefined response to the safety alert comprises a command to an alert system, and wherein the personalization module selectively associates the configurable amount of delay time with a device in the alert system.

4. The control system of claim 3, wherein the user configuration module receives the user modification real time, responsive to an alert from the alert system, and receives the geographic location from a geographic locating system when the user modification is received.

5. The control system of claim 4, wherein the user configured response is one of a plurality of user configured responses, and wherein the personalization module further (i) counts a number of user configured responses comprising both the same geographic location and the same user modification, and (ii) determines when the number is equal to a respective predetermined threshold.

6. The control system of claim 5, wherein, responsive to determining that the number is equal to the respective predetermined threshold, the personalization module further automatically, and without user input, selectively commands the alert system in accordance with the personalized alert response on each subsequent occurrence of the geographic location.

7. The control system of claim 5, wherein, responsive to determining that the number is equal to the respective predetermined threshold, the user configuration module prompts, via a combination of the user interface and a vehicle to infrastructure communication system, the user to configure personalized alert responses for the mobile platform safety system.

8. The control system of claim 1, wherein the user configuration module receives the user modification based on the user selecting an alert customization menu on a user interface.

9. A vehicle, comprising:
   an avoidance system that generates conditions data associated with a safety subsystem of the avoidance system; and
   a control system that:
      receives the conditions data,
      receives a predefined response to a safety alert indicated by the conditions data,
      receives a user input modification to the predefined response at a geographic location, the modification comprising, at a geographic location, suppressing, by a configurable amount of delay time, the predefined response associated with the safety alert,
      generates a personalized alert response for the avoidance system based on the user input and the conditions data, and
      commands an alert system associated with the vehicle in accordance with the personalized alert response.

10. The vehicle of claim 9, wherein the control system further, receives geographic position data for the vehicle, and automatically, and without user input, selectively commands the alert system in accordance with the personalized alert response, upon each subsequent occurrence of the geographic location.

11. A method of controlling a vehicle avoidance system onboard a vehicle, the method comprising:
   receiving, through a user interface, a user modification to a predefined response to a safety alert associated with the vehicle avoidance system, the user modification comprising suppressing the predefined response, (i) at a geographic location, (ii) at a specific time of day and, (iii) by a configurable amount of delay time;
   processing the safety alert, the predefined response, and the user modification to generate therefrom a personalized alert response; and
   selectively commanding an alert system associated with the vehicle in accordance with the personalized alert response.

12. The method of claim 11, wherein the modification comprises an override of the predefined response.

13. The method of claim 11, further comprising selectively associating the configurable amount of delay time with an alert device in the alert system.

14. The method of claim 12, wherein the user modification is received real time, responsive to an alert from the alert system, and
   wherein receiving the geographic location is concurrent with receiving the user modification, from a geographic locating system.

15. The method of claim 14, wherein the user configured response is one of a plurality of user configured responses, and further comprising:
   (i) counting a number of user configured responses comprising both the same geographic location and the same user modification, and
   (ii) determining when the number is equal to a respective predetermined threshold.

16. The method of claim 15, further comprising:
   responsive to determining that the number is equal to the respective predetermined threshold, automatically, and without user input, selectively commanding an alert system in accordance with the personalized alert response at each subsequent occurrence of the geographic location.

17. The method of claim 15, further comprising:
responsive to determining that the number is equal to respective predetermined threshold, prompting, via a user interface, the user to configure personalized alert responses for the avoidance system.

18. The method of claim 16, wherein prompting further comprises any combination of a vehicle to infrastructure communication system, a mobile device, and a web service.

* * * * *